United States Patent Office 3,371,129
Patented Feb. 27, 1968

3,371,129
ALLYL t-BUTYL-METHYLPHENYL ETHER AS POLYMERIZATION INHIBITOR FOR UNSATURATED POLYESTER RESINS
Jeremiah Mark Howald, Perrysburg, Ohio, assignor to American Cyanamid Company, Stamford, Conn., a corporation of Maine
No Drawing. Filed Aug. 23, 1965, Ser. No. 481,894
4 Claims. (Cl. 260—872)

ABSTRACT OF THE DISCLOSURE

This invention relates to new polymerization inhibitors for unsaturated polyester/monomer mixtures. The inhibitors are allyl t-butyl-methylphenyl ethers.

---

This invention relates to a novel class of allyl ethers of alkylated phenols and to the method of preparing the same. Still further, this invention relates to the use of allyl ethers of alkylated phenols as stabilizers against premature gelation of a polyester resin composition comprising a mixture of (1) a polyester resin prepared by reacting an $\alpha,\beta$-ethylenically unsaturated dicarboxylic acid and a dihydric alcohol and (2) a polymerizable monomer containing a $CH=CH<$ group wherein said polymerizable monomer has a boiling point of at least 60° C. at atmospheric pressure.

One of the objects of the present invention is to produce a novel class of allyl ethers of phenols. A further object of the present invention is to stabilize polyester resin compositions against premature gelation by the addition thereto of an allyl ether of a phenol wherein the polyester resin composition is comprised of a mixture of (1) an unsaturated polyester resin prepared by reacting an $\alpha,\beta$-ethylenically unsaturated dicarboxylic acid and a dihydric alcohol and (2) a polymerizable monomer containing a $CH_2=CH<$ group and having a boiling point of at least 60° C. These and other objects of the present invention will be discussed in greater detail hereinbelow.

The primary object of my invention, therefore, is to produce a workable stabilized polyester composition comprising the resin itself, various fillers, and other diluents in addition to relatively small but effective amounts of the nonvolatile, hydrocarbon soluble additive allyl di-t-butyl-methylphenyl ether. These and other objects of the present invention will be discussed in greater detail hereinbelow.

The allyl phenyl ether stabilizers of this invention may be employed as antioxidants either by themselves or in combination with other known conventional stabilizers. The amount of the phenyl ether stabilizer which may be used in the composition of the present invention may be varied in amount within the range of about 0.02 percent to 2.0 percent by weight of the total composition, and preferably from about 0.05 to about 1.0 percent by weight of the total weight of resin to which it is added. The ether stabilizer employed in the improved polyester resin composition of my invention may be prepared by first reacting at reflux conditions a sodium salt of an alkoxide, such as sodium methoxide with a substituted cresol, such as 2,6-di-t-butyl-p-cresol to form a sodium salt of ditertiary butyl-p-cresol. Next this material after being washed is reacted with a suitable lower alkenyl halide such as allyl chloride at room temperature for from 24 to 36 hours. Distillation yields a material boiling at around 170° at 50 mm. Hg which when analyzed is found to structurally conform to the postulated empirical formula. This material is then readily available for inclusion into polyester resin formulation.

The polyester resins used in the composition of the present invention are well-known in the art as illustrated by the disclosures of preparations of such in various patents such as U.S. Patents 2,255,313, 2,443,735 through 2,443,741 inclusive, among others, all of which are incorporated herein by reference in order to avoid prolixity in the present specification.

The allyl ethers of phenols of the present invention may be prepared by reacting alkali metal salts of phenols with an allyl halide.

The polyester resin "per se" is prepared by reacting an $\alpha,\beta$-ethylenically unsaturated dicarboxylic acid with a polyhydric alcohol and preferably with dihydric alcohols such as glycols. Illustrative of these $\alpha,\beta$-ethylenically unsaturated dicarboxylic acids are maleic, fumaric, itaconic, aconitic, and the like. Wherever available, the anhydrides of these acids may be used and these acids and/or their anhydrides may be used either singly or in combination with one another. The polyhydric alcohols that may be used in preparing the polyester resins of the present invention are saturated aliphatic and/or cycloaliphatic alcohols such as ethylene glycol, propylene glycol, diethylene glycol, dipropylene glycol, propanediol-1,3; butanediol-1,4; and the like. These dihydric alcohols may be used either singly or in combination with one another or higher hydroxy-containing aliphatic alcohols may be used as glycerol, pentaerythritol, dipentaerythritol, sorbitol, mannitol and the like. The use of the higher hydroxy-containing alcohols should be restricted so as to have a preponderant amount of the dihydric alcohol present thereby avoiding any significant cross-linking during the polyester resin preparation. Ordinarily, it is conventional to use with the $\alpha,\beta$-ethylenically unsaturated dicarboxylic acids other polycarboxylic acids which are free of non-benzenoid unsaturation such as phthalic, oxalic, malonic, succinic, glutaric, sebacic, adipic, pimelic, suberic, azelaic, tricarballylic, citric, tartaric, malic, and the like. Wherever available the anhydrides of these acids may be used. These polycarboxylic acids, free of non-benzenoid unsaturation and/or their anhydrides may be used either singly or in combination with one another. Reference is made to the U.S. Patent 2,777,828, Day et al. which discloses in considerable detail, the conventional amounts of the acids of both classes to be used in these polyester resins as well as the polyhydric alcohols and their amounts. In preparing these polyester resin compositions, one generally uses an excess of the polyhydric alcohol amounting to about 10% over and beyond the amount of polyhydric alcohol stoichiometrically calculated to substantially esterify all of the carboxyl groups present in the reaction vessel. Ordinarily, the esterification reaction is carried out until the acid number is less than about 55 and preferably between about 5 and 40.

The polyester resin composition is prepared by blending the polyester resin with a polymerizable monomer having a $CH_2=CH<$ group and having a boiling point of at least about 60° C. The Day et al. patent referred to hereinabove spells out in significant detail the type of polymerizable monomer which may be advantageously used including the styrene compounds and the allyl compounds. Still further, the Day et al. patent outlines the range of proportions which are conventionally used in blending the polyester resin with the polymerizable monomer.

When the polymerizable polyester composition of the present invention is to be used as a molding composition, it is desired to make use of the higher boiling monomers such as those having a boiling point in excess of about 250° C. at atmospheric pressure. This, of course, refers to polymerizable monomers of which a substantial plurality of species are available commercially such as diallyl phthalate, diallyl maleate, triallyl cyanurate, triallyl isocyanurate, ethylene glycol dimethacrylate and the like. When polyester resin molding compositions are to be prepared, it is generally necessary to make use of one or more inert fillers which are well-known in the art and are used commercially for this purpose. Included in the group of inert fillers are powdered calcium carbonate, glass fibers, asbestos fibers, clay and the like. The amount of fillers can be varied over a fairly substantial range from 0% in a filler-free composition to about 60–85% by weight based on the total weight of the composition depending on the physical properties of the molding composition desired. Large amounts such as about 80% of filler by weight preferably should be utilized, if a putty- or rope-like molding composition is desired.

Additionally, as a matter of choice, one may use coloring materials such as dyes and/or pigments but in this area the choice of coloring material and its amount is a matter of preference and is in no way an essential part of the composition. The presence of the allyl t-butyl-methylphenyl ether stabilizer serves to maintain a stable composition i.e., stable against premature gelation and/or cure during shipment and storage under the normal conditions experienced during said shipment and/or storage. In addition to the polyester and stabilizer, colorants, catalysts etc., it is frequently desirable to make use of a mold lubricant such as a metallic soap and more specifically such materials as salts of fatty acids such as zinc-stearate, zinc-oleate, aluminum stearate, aluminum palmitate and the like.

In order that the concept of the present invention may be more fuly understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLE 1

*Preparation of allyl 2,6-di-t-butyl-4-methylphenyl ether*

To a 1-liter round bottom flask was charged sodium methoxide (54 parts), 1 mole; 2,6-di-t-butyl-p-cresol (220 parts), 1 mole; toluene 500 ml.

The mixture was heated and refluxed for four hours while the toluene-methanol azeotrope was removed through a distillation column.

The resulting sodium salt of the cresol was washed with benzene and petroleum ether, dried, and dissolved, in 300 grams of acetone.

150 parts (2 moles) of allyl chloride was added. After standing at room temperature for 24 hours, the acetone solution of the ether was separated from the by-product sodium chloride by filtration.

Distillation yielded 150 g. of allyl 2,6-di-t-butyl-4-methylphenyl ether, boiling at 150–170° at 50 mm. pressure. Gas chromatography indicated that the product contained 63% ether and 22% unreacted cresol.

The ether was purified by gas chromatography to yield 99% pure product containing less than 0.1% 2,4-di-t-butyl-p-cresol.

EXAMPLE 2

*Preparation and evaluation of stabilized polyester resin composition*

Three molding compounds were prepared by blending in a spiral blade type blender of conventional design. The material achieves a putty-like consistency after mixing about 20 minutes in a spiral blade mixer. The several batches have the following formulations.

(A) No stabilizer (control batch):

| | G. |
|---|---|
| Benzoyl peroxide paste | 3.0 |
| Diallyl phthalate | 15.1 |
| Calcium carbonate | 301.8 |
| Dipropylene maleate resin | 56.2 |

(B) 0.1% ether:

| | |
|---|---|
| Benzoyl peroxide paste | 3.0 |
| Purified allyl ether of Example 1 | 0.075 |
| Diallyl phthalate | 15.0 |
| Calcium carbonate | 301.8 |
| Dipropylene maleate resin | 56.2 |

(C) 0.2% ether:

| | |
|---|---|
| Benzoyl peroxide paste | 3.0 |
| Purified allyl ether of Example 1 | 0.15 |
| Diallyl phthalate | 15.0 |
| Calcium carbonate | 301.8 |
| Dipropylene maleate | 56.2 |

40-gram samples of the putties were wrapped in aluminum foil and placed in an air-circulating oven at 50° C. The samples were considered to have jelled when a knife blade could no longer be pushed through the putty.

| Sample | Stabilizer | Time To Jell At 50° C. |
|---|---|---|
| A | None | 8 Hours. |
| B | 0.1% Allyl Ether | 18 Hours. |
| C | 0.2% Allyl Ether | 22 Hours. |

As can be seen from the tabulated data above, the inhibition of premature jelling of the resinous mixture is more than doubled by addition of the novel stabilizer. This time factor is quite important in commercial operation, since it gives the plant operators a good deal more leeway in arrangement of their production molding cycles.

I claim:
1. A polymerizable polyester resin composition comprising a mixture of:
    (1) a polyester resin prepared by reacting an $\alpha,\beta$-ethylenically unsaturated dicarboxylic acid and a dihydric alcohol,
    (2) a polymerizable monomer containing a $CH_2=C<$ group and having a boiling point of at least 60° C., and
    (3) as a stabilizer for (1) and (2), allyl t-butyl-methylphenyl ether.
2. A polymerizable polyester resin composition comprising a mixture of:
    (1) A polyester resin prepared by reacting an $\alpha,\beta$-ethylenically unsaturated dicarboxylic acid and a dihydric alcohol,
    (2) a diallyl phthalate, and
    (3) as a stabilizer for (1) and (2), allyl t-butyl-methylphenyl ether.
3. A polymerizable polyester resin composition comprising a mixture of:
    (1) a polyester resin prepared by reacting an $\alpha,\beta$-ethylenically unsaturated dicarboxylic acid and a dihydric alcohol.
    (2) a polymerizable allyl compound, and
    (3) allyl t-butyl-methylphenyl ether.
4. A polymerizable polyester resin composition comprising a mixture of:
    (1) a polyester resin prepared by reacting an $\alpha,\beta$-ethylenically unsaturated dicarboxylic acid and a dihydric alcohol,
    (2) a polymerizable allyl compound, and
    (3) allyl 2,6-di-t-butyl-4-methylphenyl ether.

References Cited

UNITED STATES PATENTS

| | | | |
|---|---|---|---|
| 2,562,140 | 8/1960 | Dafter | 260—860 |
| 2,968,679 | 1/1961 | Aelony | 260—612 |
| 2,984,643 | 5/1961 | Nischk | 260—861 |
| 3,197,526 | 7/1965 | Howald | 260—861 |
| 3,198,842 | 8/1965 | Berrigan | 260—612 |
| 3,277,157 | 10/1966 | Stewart et al. | 260—612 |

MURRAY TILLMAN, *Primary Examiner.*

J. T. GOOLKASIAN, *Assistant Examiner.*